(12) United States Patent
Kim et al.

(10) Patent No.: US 9,355,546 B2
(45) Date of Patent: May 31, 2016

(54) METHOD AND APPARATUS FOR ANALYZING CONCENTRATION LEVEL OF DRIVER

(71) Applicant: Electronics and Telecommunications Research Institute, Daejeon (KR)

(72) Inventors: Jin Woo Kim, Daejeon (KR); Tae Man Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 135 days.

(21) Appl. No.: 14/161,057

(22) Filed: Jan. 22, 2014

(65) Prior Publication Data

US 2014/0218188 A1    Aug. 7, 2014

(30) Foreign Application Priority Data

Feb. 6, 2013    (KR) .................. 10-2013-0013190

(51) Int. Cl.
  *B60Q 1/00*    (2006.01)
  *G08B 21/02*   (2006.01)
  *B60K 28/06*   (2006.01)

(52) U.S. Cl.
  CPC ................ *G08B 21/02* (2013.01); *B60K 28/06* (2013.01)

(58) Field of Classification Search
  None
  See application file for complete search history.

(56) References Cited

U.S. PATENT DOCUMENTS

| | | | |
|---|---|---|---|
| 3,922,665 A * | 11/1975 | Curry et al. | 180/272 |
| 2005/0030184 A1 * | 2/2005 | Victor | 340/576 |
| 2007/0038341 A1 | 2/2007 | Rieger et al. | |
| 2008/0042813 A1 * | 2/2008 | Wheatley et al. | 340/435 |
| 2008/0231461 A1 * | 9/2008 | Sanchez et al. | 340/575 |
| 2009/0115589 A1 * | 5/2009 | Galley et al. | 340/439 |
| 2009/0237644 A1 * | 9/2009 | Uechi | 356/29 |
| 2011/0279676 A1 * | 11/2011 | Terada et al. | 348/148 |
| 2014/0091989 A1 * | 4/2014 | Szczerba et al. | 345/7 |
| 2014/0145931 A1 * | 5/2014 | Kim et al. | 345/156 |
| 2014/0167967 A1 * | 6/2014 | He et al. | 340/576 |
| 2014/0168399 A1 * | 6/2014 | Plummer et al. | 348/78 |
| 2014/0226013 A1 * | 8/2014 | Terada et al. | 348/148 |
| 2014/0371984 A1 * | 12/2014 | Fung et al. | 701/38 |
| 2015/0025917 A1 * | 1/2015 | Stempora | 705/4 |

FOREIGN PATENT DOCUMENTS

| | | |
|---|---|---|
| EP | 1914106 A2 | 4/2008 |
| KR | 2009-0064634 A | 6/2009 |
| KR | 2009-0107110 A | 10/2009 |

* cited by examiner

*Primary Examiner* — Julie Lieu
(74) *Attorney, Agent, or Firm* — Rabin & Berdo, P.C.

(57) ABSTRACT

Provided is an apparatus and method for analyzing a concentration level of a driver, the method including analyzing quantitative data associated with a time at which a line of sight (LOS) of a driver is dispersed and a time at which the LOS of the driver is focused, analyzing a reaction speed of a human machine interface (HMI) when a command based on device input information, voice information, and gesture information is input, and evaluating a degree of LOS dispersion of the driver based on the quantitative data of the driver and the reaction speed of a user interface (UI) of the HMI.

13 Claims, 5 Drawing Sheets

METHOD AND APPARATUS FOR ANALYZING CONCENTRATION LEVEL OF DRIVER

CROSS-REFERENCE TO RELATED APPLICATION

This application claims the priority benefit of Korean Patent Application No. 10-2013-0013190, filed on Feb. 6, 2013, in the Korean Intellectual Property Office, the disclosure of which is incorporated herein by reference.

BACKGROUND

1. Field of the Invention

The present invention relates to a method and apparatus for analyzing a degree of a line of sight (LOS) dispersion of a driver manipulating a multi-modal interface during a driving time.

2. Description of the Related Art

Recently, active research is being conducted on a user interface/user experience (UI/UX) of a human-machine interface (HMI) based on a multi-modal interface in the automotive sector. In particular, research is directed to reducing a degree of a line of sight (LOS) dispersion of a driver during a driving time.

In general, a technology for analyzing a degree of an LOS dispersion of a driver with respect to a predetermined HMI depends on a reaction speed of a user in relation to a graphic user interface (GUI) in a two-dimensional tile format of a navigation screen regarding a touch screen base.

According to a tide of an HMI in the current automobile market, however, research on avoiding a use of a touch-based HMI scheme is being conducted due to an issue of safety, and legal regulations are also being contemplated.

Accordingly, a system for verifying, by performing a simulation based on driving information, a degree of LOS dispersion with respect to usability and user verification for an HMI UI/UX not adopting a touch-based scheme is necessary.

In addition, advancements have been made in a vehicular infotainment system in recent years, and intelligent information available for driver interaction has not only been diversified but also become more complex. The vehicular infotainment system is provided to enable a driver to stably drive, and provides improved information during a driving time so as to obtain other information and enhance a level of convenience in driving.

In practice, however, drivers inevitably experience an LOS dispersion for manipulation while driving, which may lead to a dangerous situation for the driver. A gradual change from an HMI UI/UX manipulation scheme based on touching a display to a HMI UI/UX manipulation scheme based on voice recognition, gesture recognition, and an augmented reality causes a change of the conventional UI.

Accordingly, an advanced verification scheme for driver recognition and external circumstances recognition performed using a manipulation scheme based on a multi-modal interface using a recognition technology is necessary, in lieu of the conventional verification simulation scheme, with respect to a tile format applied to an icon and a touch-based HMI manipulation scheme.

SUMMARY

According to an aspect of the present invention, there is provided an apparatus for analyzing a concentration level of a driver, the apparatus including a line of sight (LOS) dispersion analyzer configured to analyze quantitative data associated with a time at which an LOS of a driver is dispersed and a time at which the LOS of the driver is focused, a reaction speed analyzer configured to analyze a reaction speed of a human machine interface (HMI) when a command based on device input information, voice information, and gesture information is input, and an LOS dispersion evaluator configured to evaluate a degree of LOS dispersion of the driver based on the quantitative data of the driver and the reaction speed of a user interface (UI) of the HMI.

The apparatus for analyzing a concentration level of a driver may further include a user experience (UX) platform driving unit to be linked with the LOS dispersion evaluator through a connection with a multiple input device.

The LOS dispersion analyzer may quantify, based on driving information and driving conditions displayed on a display, the time at which the LOS of the driver is focused and a reaction speed of recognition time, thereby acquiring the quantified time and reaction speed.

The driving information may include driving information displayed on a head-up display (HUD), driving information displayed on an instrument cluster, and driving information displayed on a center display.

The reaction speed may include a recognition reaction speed of the driver with respect to the UX of the HMI.

The LOS dispersion evaluator may include a weighted value calculator configured to calculate a weighted value with respect to the quantitative data of the driver and the reaction speed of the UX, a concentration level calculator configured to calculate an LOS concentration level of the driver based on a velocity, an obstruction frequency calculator configured to calculate an obstruction frequency of the LOS of the driver based on an environmental complexity, and an LOS dispersion time calculator configured to calculate a period of time during which the LOS of the driver is dispersed.

According to another aspect of the present invention, there is also provided an apparatus for analyzing a concentration level of a driver, the apparatus including an interface plug-in driving unit configured to be input device input information, gesture information, and voice information and connected to a UI manipulated by a driver, a data learning unit configured to learn information associated with a UI manipulation with respect to a behavior and a reaction of the driver based on driving conditions, a framework driving unit configured to collect the device input information, the gesture information, the voice information, external environment information, and rendering information based on a focus of the driver and an LOS of the driver, and a UX engine unit configured to analyze a driving concentration level of the driver by receiving the device input information, the gesture information, the voice information, the external environment information, and the rendering information from the framework driving unit.

The framework driving unit may collect the device input information, the gesture information, the voice information, the external environment information, and the rendering information and transfer the collected information to the UX engine unit, at a point in time at which the driver manipulates the UI.

According to still another aspect of the present invention, there is also provided a method of analyzing a concentration level of a driver, the method including analyzing quantitative data associated with a time at which an LOS of a driver is dispersed and a time at which the LOS of the driver is focused, analyzing a reaction speed of an HMI when a command based on device input information, voice information, and gesture information is input, and evaluating a degree of LOS dispersion of the driver based on the quantitative data of the driver and the reaction speed of a UI of the HMI.

According to yet another aspect of the present invention, there is also provided a method of analyzing a concentration level of a driver, the method including receiving device input information, gesture information, and voice information to be connected to a UI manipulated by a driver, learning information associated with a user interface operation with respect to a behavior and a reaction of the driver based on driving conditions, collecting the device input information, the gesture information, the voice information, external environment information, and rendering information based on a focus of the driver and an LOS of the driver, and analyzing a driving concentration level of the driver by receiving the device input information, the gesture information, the voice information, the external environment information, and the rendering information from the framework driving unit.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings. The embodiments herein and the various features and advantageous details thereof are explained more fully with reference to the non-limiting embodiments that are illustrated in the accompanying drawings and detailed in the following description.

When it is determined detailed description related to a related known function or configuration they may make the purpose of the present invention unnecessarily ambiguous in describing the present invention, the detailed description will be omitted here. Also, terminologies used herein are defined to appropriately describe the exemplary embodiments of the present invention and thus may be changed depending on a user, the intent of an operator, or a custom. Accordingly, the terminologies must be defined based on the following overall description of this specification.

According to an embodiment of the present invention, there is provided a method of verifying a user interface/user experience (UI/UX) of a human machine interface (HMI) recently designed for safely providing augmented reality and infotainment during a driving time. For example, when a driver manipulates the HMI, through a device input, based on voice recognition and gesture recognition separately or a multi-modal scheme of the voice recognition and the gesture recognition during a driving time, a quantitative analysis may be performed on interference factors of a line of sight (LOS) and a concentration level of the driver. In general, the device input may be implemented based on a wheel button, a jog-and-shuttle, and a touch pad.

Currently, a scope of the international organization for standardization (ISO) 26262 which establishes all elements related to a vehicular electronic system as standards based on safety and manages the standards, includes a head-up display (HUD) and a cluster. Accordingly, providing an infotainment service linked with the HUD, the cluster, or a center display of a head unit is expected. In an embodiment of the present invention, it is possible to prepare for safety constraints and apply leverage on safety standards establishment when the scope of the ISO 26262 is extended to an augmented reality.

Figure 1:
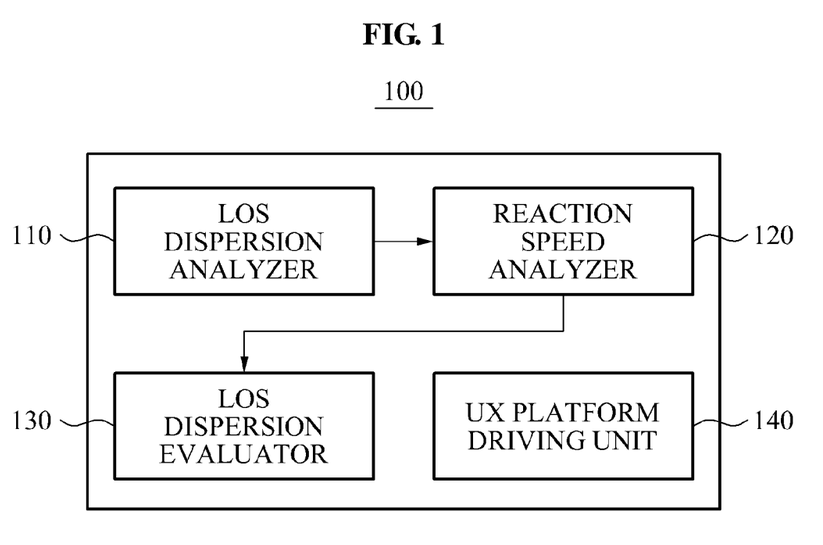
FIG. 1 is a block diagram illustrating a configuration of an apparatus for analyzing a concentration level of a driver according to an embodiment of the present invention.

FIG. 1 is a block diagram illustrating a configuration of an apparatus 100 for analyzing a concentration level of a driver according to an embodiment of the present invention.

Referring to FIG. 1, the apparatus 100 for analyzing a concentration level of a driver according to an embodiment of the present invention includes an LOS dispersion analyzer 110, a reaction speed analyzer 120, and an LOS dispersion evaluator 130.

The LOS dispersion analyzer 110 may analyze quantitative data associated with a time at which an LOS of a driver is dispersed and a time at which the LOS of the driver is focused. The reaction speed analyzer 120 may analyze a reaction speed of a user interface (UI) of an HMI when a command is input based on device input information, voice information, and gesture information. The LOS dispersion evaluator 130 may evaluate a degree of the LOS dispersion of the driver based on the quantitative data and the reaction speed of the UI of the HMI.

The apparatus 100 for analyzing a concentration level of a driver may further include a user experience (UX) platform driving unit 140. The UX platform driving unit 140 may be linked with the LOS dispersion evaluator 130 through a connection with a multiple input device.

The UX platform driving unit 140 may be provided in an extended UX platform structure linked with an evaluation system through a connection with the multiple input device. For example, the UX platform driving unit 140 may establish a standard input interface plug-in based on an HMI-framework to be linked with a multi-modal interface. Also, the UX platform driving unit 140 may establish an HMI utilizing voice recognition, gesture recognition, a multi-device, and the like.

The LOS dispersion analyzer 110 may quantify the time at which the LOS of the driver is concentrated and a reaction speed of recognition time based on driving information and driving conditions displayed on a display, thereby acquiring the quantified time and reaction speed.

According to an aspect of the present invention, the driving information may include driving information displayed on an HUD, driving information displayed on an instrument cluster, and driving information displayed on a center display. The reaction speed may include a recognition reaction speed of the driver with respect to a UX of an HMI.

For example, the reaction speed analyzer 120 may analyze a graphical user interface (GUI) recognition reaction speed of the driver with respect to the UX of the HMI manipulated using a wheel button and a jog dial. The reaction speed analyzer 120 may analyze an input scheme of the UX of the HMI based on a voice recognition command. The reaction speed analyzer 120 may analyze the recognition reaction speed of the driver with respect to the UX of the HMI in response to a sentence-based control and a word-based control. The reaction speed analyzer 120 may analyze whether feedback in response to an input using a multi-modal interface is appropriate.

The LOS dispersion evaluator 130 may evaluate the analyzed information using various calculators, for example, a weighted value calculator, a concentration level calculator, an obstruction frequency calculator, an LOS dispersion time calculator, and the like.

For example, the weighted value calculator may calculate a weighted value with respect to the quantitative data of the driver and the reaction speed of the UI. The concentration level calculator may calculate an LOS concentration level of the driver based on a velocity. The obstruction frequency calculator may calculate an obstruction frequency of the LOS of the driver based on an environmental complexity. The LOS dispersion time calculator may calculate a period of time during which the LOS of the driver is dispersed.

Hereinafter, descriptions about a simulation system for an HMI evaluation of an apparatus for analyzing a concentration level of a driver according to an aspect of the present invention will be provided.

Figure 2:
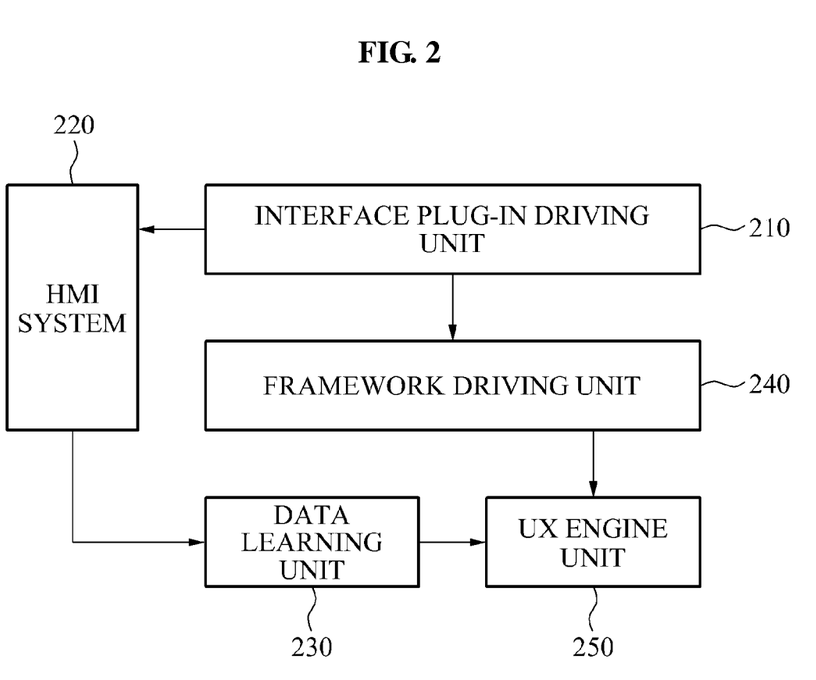
FIG. 2 is a block diagram illustrating a configuration of a simulation system according to an aspect of the present invention.

FIG. 2 is a block diagram illustrating a configuration of the simulation system according to an aspect of the present invention.

Referring to FIG. 2, the simulation system may include an interface plug-in driving unit 210, an HMI system 220, a data learning unit 230, a framework driving unit 240, and a UX engine unit 250.

The interface plug-in driving unit 210 may be input device input information, gesture information, and voice information, and connected to a UI manipulated by a driver. The data learning unit 230 may learn information associated with a UI manipulation with respect to a behavior and a reaction of the driver based on driving conditions.

The framework driving unit 240 may collect the device input information, the gesture information, the voice information, external environment information, and rendering information based on the LOS and a focus of the driver. The UX engine unit 250 may analyze a driving concentration level of the driver by receiving the device input information, the gesture information, the voice information, the external environment information, and the rendering information from the framework driving unit 240.

The framework driving unit 240 may collect the device input information, the gesture information, the voice information, the external environment information, and the rendering information and transfer the collected information to the UX engine unit 250, at a point in time at which the driver manipulates the UI.

Figure 3:
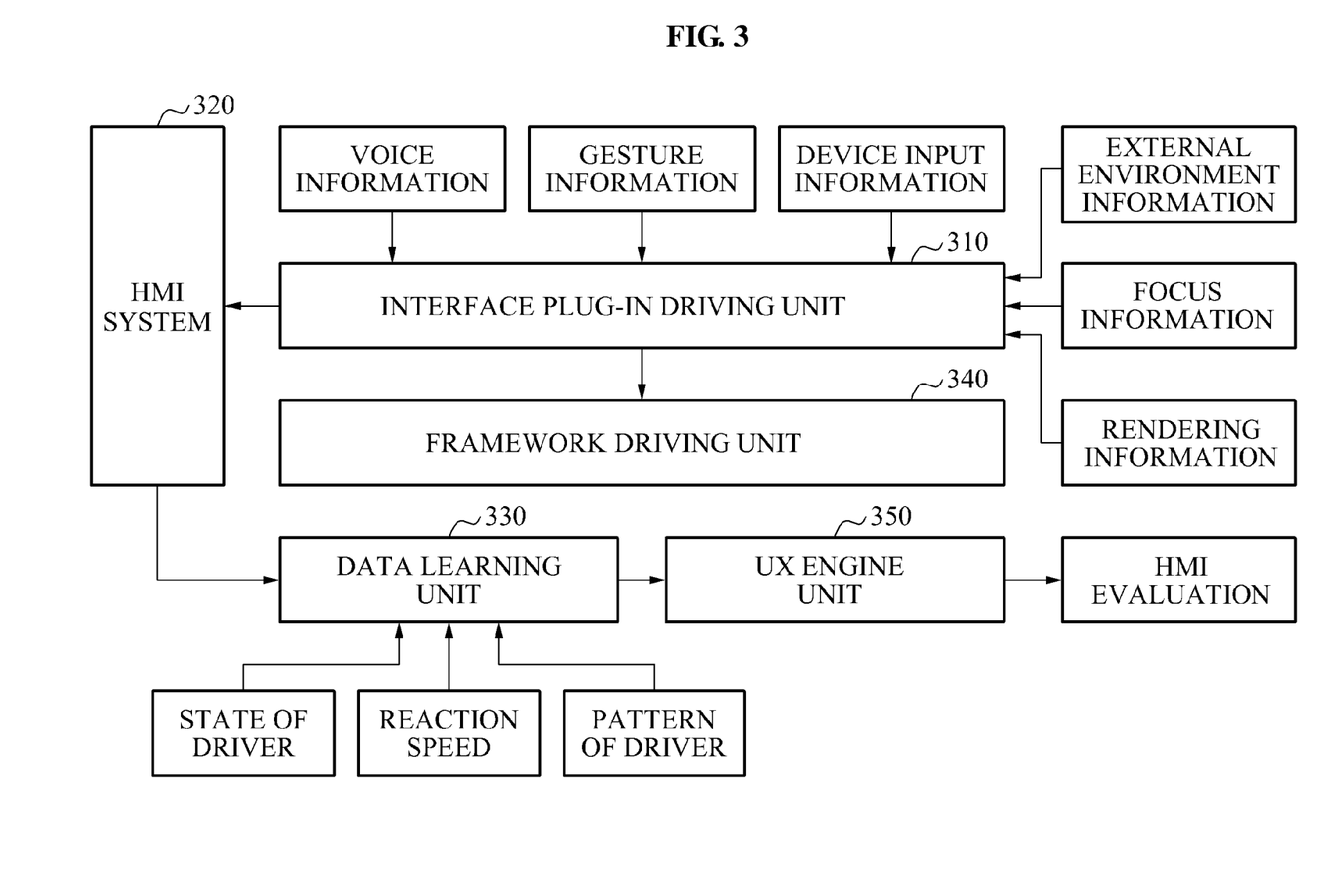
FIG. 3 is a block diagram illustrating a detailed configuration of a simulation system according to an aspect of the present invention.

FIG. 3 illustrates a detailed configuration of a simulation system according to an embodiment of the present invention.

Referring to FIG. 3, an interface plug-in driving unit 310 corresponds to a standard plug-in driving unit to receive device input information, gesture information, and voice information and connected to a UI manipulated by a driver. The interface plug-in driving unit 310 may calculate a focal distance of the driver by receiving information used for recognizing an external environment of a vehicle, and be access information used for rendering a two-dimensional (2D) object or a three-dimensional (3D) object in an augmented reality.

An apparatus for analyzing a concentration level of a driver may be connected to a UI/UX of an HMI to be evaluated, using the interface plug-in driving unit 310 and extract a predetermined behavior and a predetermined reaction of the driver in response to various circumstances through a connection with a system in which an open source-based or a common use platform-based vehicular HMI is mounted. For example, the apparatus for analyzing a concentration level of a driver may extract information used to manipulate the UI of HMI using an allowed UX, and transfer the information to a data learning unit 330. In this instance, external environment information, focus information, and rendering information based on an LOS and a focus may be transferred to a UX engine unit 350 through a framework driving unit 340.

The framework driving unit 340 may perform a function as a framework for transferring, to the UX engine unit 350, gesture information, voice information, device input information, external environment information, focus information, rendering information, and the like. The information may be transferred in a state of a point in time in which the driver manipulates an HMI system 320.

The data learning unit 330 may perform componentization on data associated with a state of a driver, a pattern of a driver, and a reaction speed, and esthetic elements and physical elements of a driver varying based on driving conditions obtained through a survey, thereby storing a result of the componentization in a database. Also, the data learning unit 330 may update data for each time of learning.

The data componentized in the data learning unit 330 may be transferred to the UX engine unit 350. The UX engine unit 350 may compare the transferred data to the information transferred in a state of a point in time at which the driver manipulates an HMI system, thereby analyzing an algorithm associated with a degree of LOS dispersion based on an internal and external environment, a manipulation for safety, and the like.

The UX engine unit 350 may provide, through the HMI system 320, a real time result of analyzing to an evaluator, and notify of a portion causing an issue and a portion to be solved, thereby correcting the UI/UX of HMI.

Figure 4:
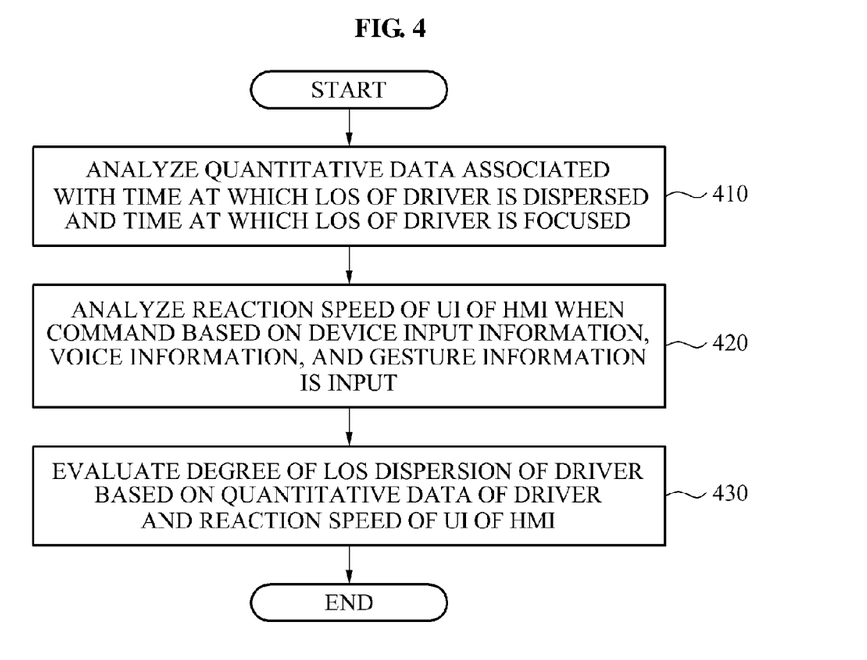
FIG. 4 is a flowchart illustrating a method of analyzing a concentration level of a driver according to an embodiment of the present invention.

FIG. 4 is a flowchart illustrating a method of analyzing a concentration level of a driver according to an embodiment of the present invention.

Referring to FIG. 4, in operation 410, an apparatus for analyzing a concentration level of a driver may analyze quantitative data associated with a time at which an LOS of a driver is dispersed and a time at which the LOS of the driver is focused. In operation 420, the apparatus for analyzing a concentration level of a driver may analyze a reaction speed of a UI of an HMI when a command based on device input information, voice information, and gesture information is input.

In operation 430, the apparatus for analyzing a concentration level of a driver may evaluate a degree of LOS dispersion of the driver based on the quantitative data of the driver and the reaction speed of the UI of the HMI.

Figure 5:
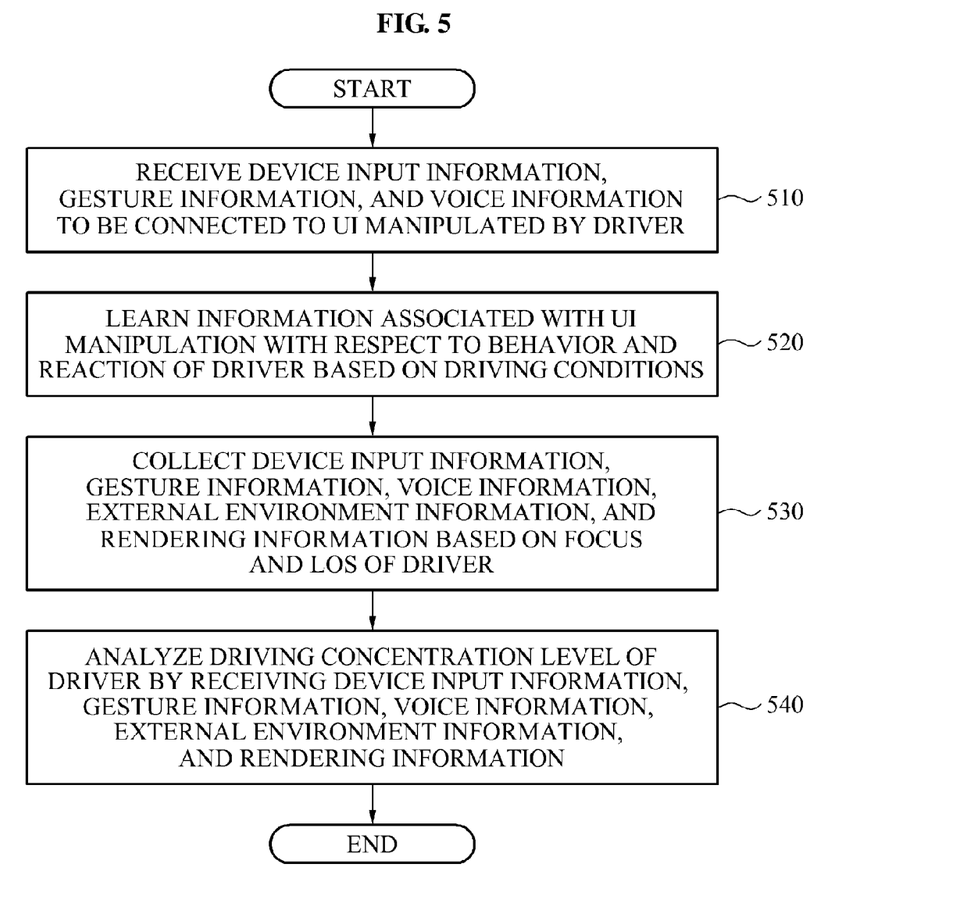
FIG. 5 is a flowchart illustrating a method of analyzing a concentration level of a driver according to another embodiment of the present invention.

FIG. 5 is a flowchart illustrating a method of analyzing a concentration level of a driver according to another embodiment of the present invention.

Referring to FIG. 5, in operation 510, an apparatus for analyzing a concentration level of a driver may be receive device input information, gesture information, and voice information and connected to a UI manipulated by a driver. In operation 520, the apparatus for analyzing a concentration level of a driver may learn information associated with a UI manipulation with respect to a behavior and a reaction of the driver based on driving conditions.

In operation 530, the apparatus for analyzing a concentration level of a driver may collect the device input information, the gesture information, the voice information, external environment information, and rendering information based on a focus of the driver and the LOS of the driver. In operation 540, the apparatus for analyzing a concentration level of a driver may analyze a driving concentration level of the driver by receiving the device input information, the gesture information, the voice information, the external environment information, and the rendering information.

In a method of analyzing a concentration level of a driver according to an aspect of the present invention, due to development of a vehicular infotainment system for recognizing a state of driver, a system for evaluating a UI/UX of an HMI without an interference resulting from an external environment during a driving time may be provided to a driver manipulating an HMI using an intuitive interface.

According to an example embodiment of the present invention, there is provided a method of verifying a UI/UX of an HMI designed for safely providing an augmented reality and infotainment during a driving time.

According to another example embodiment of the present invention, there is also provided information to be used by a driver using a simple gesture and a pointing motion in a vehicle absent LOS interference during a driving time.

According to still another example embodiment of the present invention, there is also provided a system for analyzing that an influence of an external environment, and whether a UI/UX of an HMI provides an efficient UI.

According to yet another example embodiment of the present invention, there is also provided standardization of an evaluation system by providing an HMI to be evaluated and a standard plug-in to be used through a connection with multiple input devices based on the HMI.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for analyzing a concentration level of a driver, the apparatus comprising:
a line of sight (LOS) dispersion analyzer configured to analyze quantitative data associated with a time at which an LOS of a driver is dispersed and a time at which the LOS of the driver is focused;
a reaction speed analyzer configured to analyze a reaction speed of a human machine interface (HMI) when a command based on device input information, voice information, and gesture information is input; and
an LOS dispersion evaluator configured to evaluate a degree of LOS dispersion of the driver based on the quantitative data and a reaction speed of a user interface (UI) of the HMI;
wherein the LOS dispersion analyzer is configured to quantify, based on driving information and driving conditions displayed on a display, the time at which the LOS of the driver is focused and a reaction speed of recognition time.

2. The apparatus of claim 1, further comprising:
a user experience (UX) platform driving unit to be linked with the LOS dispersion evaluator through a connection with a multiple input device.

3. The apparatus of claim 1, wherein the driving information comprises driving information displayed on a head-up display (HUD), driving information displayed on an instrument cluster, and driving information displayed on a center display.

4. The apparatus of claim 1, wherein the reaction speed comprises a recognition reaction speed of the driver with respect to a UX of the HMI.

5. The apparatus of claim 1, wherein the LOS dispersion evaluator comprises:
a weighted value calculator configured to calculate a weighted value with respect to the quantitative data and the reaction speed of the UI;
a concentration level calculator configured to calculate an LOS concentration level of the driver based on a velocity;
an obstruction frequency calculator configured to calculate an obstruction frequency of the LOS of the driver based on an environmental complexity; and
an LOS dispersion time calculator configured to calculate a period of time during which the LOS of the driver is dispersed.

6. An apparatus for analyzing a concentration level of a driver, the apparatus comprising:
an interface plug-in driving unit configured to be input device input information, gesture information, and voice information and connected to a user interface (UI) operated by a driver;
a data learning unit configured to learn information associated with a UI manipulation with respect to a behavior and a reaction of the driver based on driving conditions;
a framework driving unit configured to collect the device input information, the gesture information, the voice information, external environment information, and rendering information based on a focus of the driver and a line of sight (LOS) of the driver; and
a user experience (UX) engine unit configured to analyze a driving concentration level of the driver by receiving the device input information, the gesture information, the voice information, the external environment information, and the rendering information from the framework driving unit.

7. The apparatus of claim 6, wherein the framework driving unit is configured to collect the device input information, the gesture information, the voice information, the external environment information, and the rendering information and transfer the collected information to the UX engine unit, at a point in time at which the driver manipulates the UI.

8. A method of analyzing a concentration level of a driver, the method comprising:

analyzing quantitative data associated with a time at which a line of sight (LOS) of a driver is dispersed and a time at which the LOS of the driver is focused;

analyzing a reaction speed of a human machine interface (HMI) when a command based on device input information, voice information, and gesture information is input; and evaluating a degree of LOS dispersion of the driver based on the quantitative data and the reaction speed of a user interface (UI) of the HMI;

wherein the analyzing of quantitative data comprises:

quantifying, based on driving information and driving conditions displayed on a display, the time at which the LOS of the driver is focused and a reaction speed of recognition time.

9. The method of claim 8, wherein the driving information comprises driving information displayed on a head-up display (HUD), driving information displayed on an instrument cluster, and driving information displayed on a center display.

10. The method of claim 8, wherein the reaction speed comprises a recognition reaction speed of the driver with respect to a user experience (UX) of the HMI.

11. The method of claim 8, further comprising:

calculating a weighted value with respect to the quantitative data of the driver and the reaction speed of the UI of the HMI;

calculating an LOS concentration level of the driver based on a velocity;

calculating an obstruction frequency of the LOS of the driver based on an environmental complexity; and calculating an LOS dispersion time of the driver.

12. A method of analyzing a concentration level of a driver, the method comprising:

receiving device input information, gesture information, and voice information to be connected to a user interface (UI) operated by a driver;

learning information associated with a user interface operation with respect to a behavior and a reaction of the driver based on driving conditions;

collecting the device input information, the gesture information, the voice information, external environment information, and rendering information based on a focus of the driver and a line of sight (LOS) of the driver; and analyzing a driving concentration level of the driver by receiving the device input information, the gesture information, the voice information, the external environment information, and the rendering information from the framework driving unit.

13. The method of claim 12, wherein the collecting comprises:

collecting the device input information, the gesture information, the voice information, the external environment information, and the rendering information at a point in time at which the user manipulates the UI.

* * * * *